United States Patent [19]

Usui

[11] Patent Number: 4,899,965
[45] Date of Patent: Feb. 13, 1990

[54] APPARATUS FOR COLLECTIVELY FIXING PIPES

[75] Inventor: Masayoshi Usui, Numazu, Japan

[73] Assignee: Usui Kokusai Sangyo Kaisha Ltd., Nagasawa, Japan

[21] Appl. No.: 302,837

[22] Filed: Jan. 27, 1989

[30] Foreign Application Priority Data

Feb. 16, 1988 [JP] Japan .............................. 63-19161[U]

[51] Int. Cl.$^4$ ................................................ F16L 3/22
[52] U.S. Cl. .................................... 248/68.1; 138/106; 138/107; 138/111; 174/71 R
[58] Field of Search ..................... 248/68.1, 70, 73, 65, 248/49; 24/563, 115; 174/71 R; 138/106, 107, 111

[56] References Cited

U.S. PATENT DOCUMENTS

| | | | |
|---|---|---|---|
| 3,872,881 | 3/1975 | Miller et al. | 248/68.1 X |
| 4,643,379 | 2/1987 | Potocnik | 248/49 |
| 4,773,451 | 9/1988 | Hegler et al. | 248/68.1 X |
| 4,781,255 | 11/1988 | Lock et al. | 248/68.1 X |

Primary Examiner—Ramon O. Ramirez
Attorney, Agent, or Firm—Anthony J. Casella; Gerald E. Hespos

[57] ABSTRACT

An apparatus for collectively fixing a plurality of pipes (e.g, metallic pipes, resin tubes, etc.) with a relatively small diameter, each having a bent portion, by means of a plate-shaped clamp member having a sectorial clamping wall portion having a substantially U-shaped cross-section and a mounting wall portion which is secured to a base member, the mounting wall portion being formed by diametrically extending one end portion of one side wall of the clamp member, so that the bent portions of the pipes which are disposed side by side within one plane are clamped in a lump by means of the clamping wall portion in such a manner that the bent portions are snugly engaged with the circularly curved portion of the clamping wall portion, thus effectively and reliably fixing the pipes in a lump without any fear of the fixed pipes being displaced axially or circumferentially or being collapsed.

8 Claims, 2 Drawing Sheets

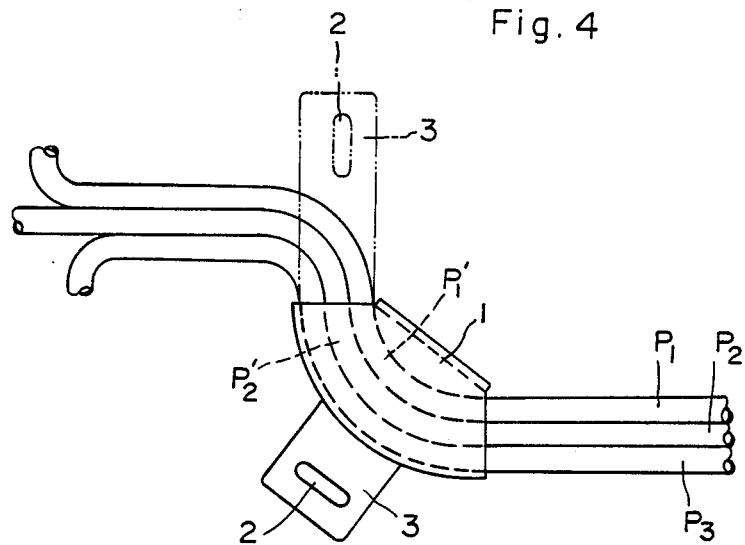

APPARATUS FOR COLLECTIVELY FIXING PIPES

BACKGROUND OF THE INVENTION

1. Field of the Invention:

The present invention relates to an apparatus for collectively fixing a plurality of metallic pipes or resin tubes (hereinafter referred to as simply "pipes"), having a relatively small diameter, i.e., less than about 20 mm, which are generally disposed as being passages for supplying fuel, oil or air in automobiles or various other kinds of machinery or apparatus in such a manner that bent portions of such pipes are collectively fixed by means of a clamp member which is secured to a base member provided on such machinery or apparatus.

2. Description of the Prior Art:

A typical conventional collectively fixing apparatus of the type described above has heretofore been arranged as shown in FIG. 5. More specifically, in the case of metallic pipes, a plurality of metallic pipes $P_{11}$, $P_{12}$... are collectively fixed at straight portions thereof which are at an appropriate position in the longitudinal direction by means of a clamp member 11 having a mounting wall portion 13 provided with a bolt receiving bore 12 and a clamping wall portion 14 which is bent simply in the shape of a hook in such a manner that the straight pipe portions are collectively retained by the clamping wall portion 14 or the straight pipe portions thus retained are brazed to the clamping wall portion 14. In the case of resin tubes, the straight portions of the tubes are fixed in a lump.

The above-described prior art suffers, however, from the following problems. In the case of the former fixing structure, since a plurality of metallic pipes $P_{11}$, $P_{12}$... are collectively retained or brazed at longitudinally straight portions thereof, the bundled pipes may be displaced axially and circumferentially or rubbed against each other and thus scratched due to vibration of the vehicle, machine or apparatus, on which they are disposed, during long-term service, which results in crack or other failure. Further, since it is necessary to subject the whole product to anticorrosion coating by means, for example, of plating after brazing process, the process for plating the bundle of pipes having a complicated bent configuration involves a considerably troublesome operation, so that the operability is impaired. In addition, it is difficult to form a deposited coating which is capable of exhibiting desired high resistance to corrosion.

In the latter conventional fixing structure wherein the straight tube portions are retained in a bundle, it is often that the tubes are collapsed to interfere with the flow of a fluid in the tubes. In addition, the retained portions of the tubes may be displaced axially or circumferentially due to vibration or the like, thus causing problems.

SUMMARY OF THE INVENTION

It is a primary object of the present invention to provide an apparatus for collectively fixing pipes which is designed so that the above-described problems of the prior art are effectively solved.

To this end, the present invention provides an apparatus for collectively fixing pipes comprising: a plurality of pipes with a relatively small diameter, each pipe having a bent portion; and a plate-shaped clamp member having a sectorial clamping wall portion having a substantially U-shaped cross-section and a mounting wall portion which is secured to a base member, the mounting wall portion being formed by extending one end portion of one side wall of the clamp member, so that the bent portions of the pipes which are disposed side by side within one plane are clamped in a lump by means of the clamping wall portion in such a manner that the bent pipe portions are snugly engaged with the circularly curved portion of the clamping wall portion.

The sectorial clamping wall portion may be provided with a plurality of radial cut portions.

By virtue of the above-described arrangement, the bent portions of a plurality of pipes are clamped in a lump by means of the clamping wall portion in such a manner that the bent pipe portions are snugly engaged with the circularly curved portion of the clamping wall portion which is formed so as to have a configuration which is coincident with the configuration of a bundle of bent pipe portions which are disposed side by side within one plane, thus effectively and reliably fixing the pipes in a lump without any fear of the fixed pipes being displaced axially or circumferentially or being collapsed.

BRIEF DESCRIPTION OF THE DRAWINGS

The above and other objects, features and advantages of the present invention will become more apparent from the following description of the preferred embodiments thereof, in which like reference numerals denote like elements and, of which:

FIG. 4 is a plan view of still another embodiment of the present invention; and

DETAILED DESCRIPTION OF PREFERRED EMBODIMENTS

Figure 1:
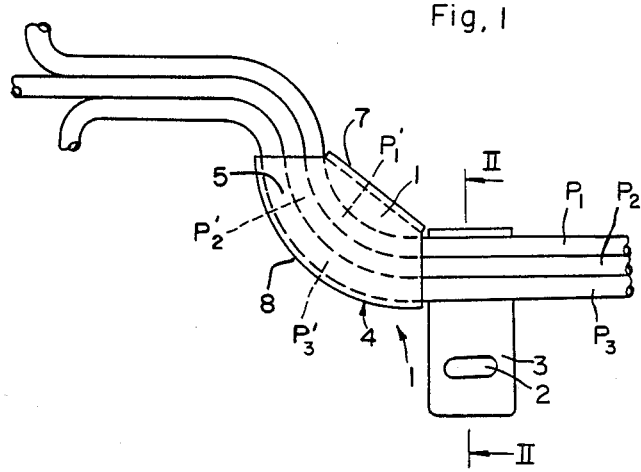
FIG. 1 is a plan view of an apparatus for collectively fixing pipes by means of a clamp member according to one embodiment of the present invention.
Figure 2:
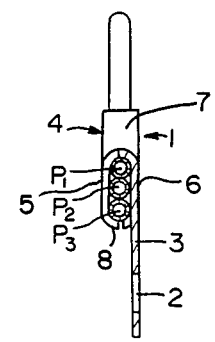
FIG. 2 is a sectional view taken along the line II—II of FIG. 1.
Figure 3:
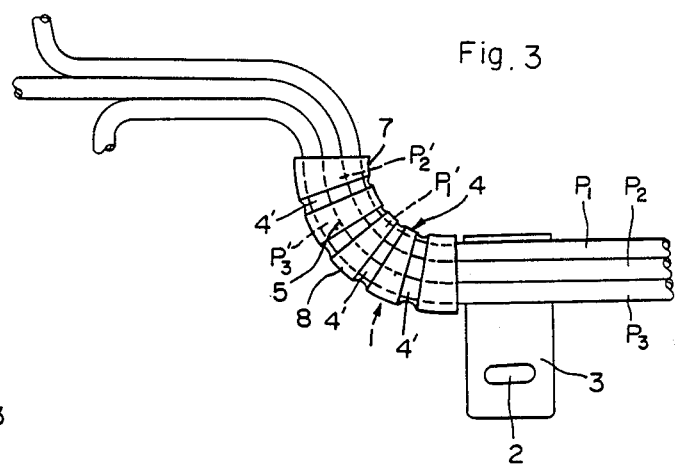
FIG. 3 is a plan view of another embodiment of the present invention.
Figure 5:
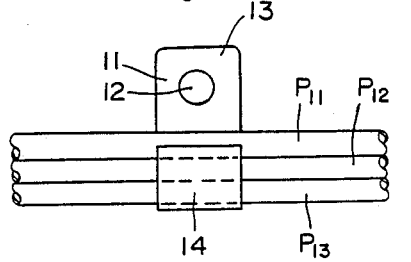
FIG. 5 is a plan view of a conventional apparatus for collectively fixing pipes.

Referring to FIGS. 1 to 3, the reference numeral 1 denotes a plate-shaped clamp member made, for example, of a metallic material. The clamp member 1 has a sectorial clamping wall portion 4 having a U-shaped cross-section. One end portion of one side wall of the clamp member 1 is extended diametrically to define a mounting wall portion 3 having a bolt-receiving bore 2 through which the clamp member 1 is secured to a base member (not shown). The clamping wall portion 4 is formed in the shape of a circular arc which is coincident with the configuration of a bundle of bent portions $P'_1$, $P'_2$... of a plurality of relatively thin pipes $P_1$, $P_2$..., e.g., metallic pipes, resin tubes, etc., having a diameter of about 20 mm or less. The bent portions of the pipes is provided at an appropriate position in the longitudinal direction of the bundle of pipes and are disposed side by side within one plane. The sectorial clamping wall portion 4 includes first and second side walls 5 and 6 disposed on opposite respective sides of the bent portions $P'_1$, $P'_2$... and generally parallel to the plane thereof. The sectorial clamping wall portion 4 further includes an inner wall 7 extending between the side walls and disposed radially inwardly of the bent portions $P'_1$, $P'_2$... of the pipes $P_1$, $P_2$..., and a curved wall portion 8 extending from the side walls 5 and 6 and disposed radially outwardly of the bent portion $P'_1$, $P'_2$... of the pipes $P_1$, $P_2$.... It should be noted that, if one side of the sectorial clamping wall portion 4 having a U-shaped cross-section is provided with a plurality of radial cut portions 4', the bending operation is facilitated. The bent portions $P'_1$, $P'_2$... of the pipes $P_1$, $P_2$...., which are disposed side by side, are snugly engaged in a lump with the circularly curved portion 8 of the clamping wall portion 4, thereby clamping the bent portions $P'_1$, $P'_2$... by means of the clamp member 1.

The mounting wall portion 3 may be optionally positioned relatively to the base member. For example, as shown in FIG. 4, it may be extended diametrically and outwardly from the clamping wall portion 4 or may be extended substantially axially and outwardly as shown by dash and dotted lines.

As has been described above, according to the present invention, the bent portions $P'_1$, $P'_2$... of a plurality of pipes $P_1$, $P_2$... are collectively fixed by means of the clamp member 1 having a configuration which is coincident with the configuration of a bundle of bent portions $P'_1$, $P'_2$... which are disposed side by side within one plane in such a manner that the bent portions $P'_1$, $P'_2$... are snugly engaged in a lump with the circularly curved portion of the clamping wall portion 4, thereby enabling the fixed pipe portions to be effectively and reliably secured for a long period of time even under vibratory condition, and effectively preventing axial and circumferential displacement of the fixed pipes $P_1$, $P_2$... by means of the engagement between the bent pipe portions $P'_1$, $P'_2$... and the circularly curved portion of the clamping wall portion 4. Accordingly, it is possible to eliminate the fear of the pipes $P_1$, $P_2$... being scratched, cracked or broken at the clamp position. In the case of metallic pipes, it is possible to use pipes $P_1$, $P_2$... which have previously been subjected to anticorrosive coating by, for example, of plating, so that it becomes unnecessary to conduct plating treatment after the pipes $P_1$, $P_2$... have been collectively fixed and hence possible to improve the operability by a large margin. In the case of resin tubes, it is possible to eliminate the fear of collapse and therefore ensure flow of a fluid in the tubes. Thus, the present invention provides a considerably useful apparatus for collectively fixing pipes by means of a clamp member.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. An apparatus for collectively fixing pipes to a base member, said apparatus, comprising:
   a plurality of pipes with a relatively small diameter each said pipe having a bent portion, said bent portions of said pipes being disposed in side by side relationship in a single plane; and
   a clamp member having a clamping wall portion comprising first and second side walls disposed on opposite respective sides of the bent portions of the pipes and generally parallel to the plane thereof, an inner wall extending between the side walls and disposed radially inwardly of the bent portion of the pipes, a curved wall portion extending from the side walls and disposed radially outwardly of the bent portion of the pipes and snuggly engaged therewith, said clamp member further comprising a mounting wall portion extending from one of said side walls for mounting said apparatus to the base, whereby the engagement of the curved wall with bent portion of the pipes prevents axial and circumferential displacement of the pipes.

2. An apparatus according to claim 1, wherein said sectorial clamping wall portion has a plurality of radial cut portions.

3. An apparatus according to claim 1, wherein said pipes are either metallic pipes or resin tubes.

4. An apparatus according to claim 1, wherein said pipes have a diameter of 20 mm or less.

5. An apparatus as in claim 1 wherein the mounting wall portion is aligned in a non-radial direction relative to the bent portion of the pipes.

6. An apparatus as in claim 1 wherein the curved wall is of sectional construction, with a first section of the curved wall extending unitarily from the first side wall and with a second section extending unitarily from the second side wall.

7. An apparatus as in claim 1 wherein the clamp member is formed from a unitary piece of metal material.

8. An apparatus as in claim 1 wherein the mounting wall portion is aligned generally parallel to a radius of a bent portion of the pipes.

* * * * *